(No Model.)

D. B. STEPHENS.
Horseshoe.

No. 234,695. Patented Nov. 23, 1880.

Witnesses:
Albert H. Krause
Fred. G. Dieterich

Inventor:
D. B. Stephens
by C. A. Snow & Co.
Attorneys.

N. PETERS, PHOTO-LITHOGRAPHER, WASHINGTON, D. C.

UNITED STATES PATENT OFFICE.

DABNEY B. STEPHENS, OF LYNCHBURG, VA., ASSIGNOR OF ONE-HALF OF HIS RIGHT TO EDMUND M. PACE AND ROBERT G. PACE, OF SAME PLACE.

HORSESHOE.

SPECIFICATION forming part of Letters Patent No. 234,695, dated November 23, 1880.

Application filed May 8, 1880. (No model.)

*To all whom it may concern:*

Be it known that I, DABNEY B. STEPHENS, of Lynchburg, in the county of Campbell and State of Virginia, have invented certain new and useful Improvements in Horseshoes; and I do hereby declare that the following is a full, clear, and exact description of the invention, which will enable others skilled in the art to which it appertains to make and use the same, reference being had to the accompanying drawings, which form a part of this specification.

Figure 1:
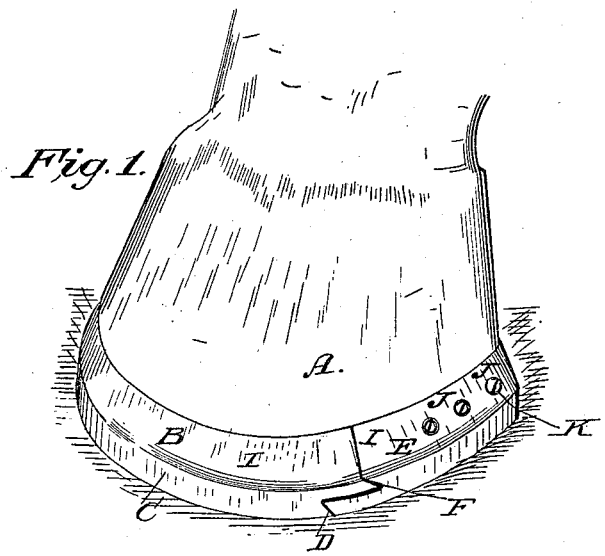
Figure 2:
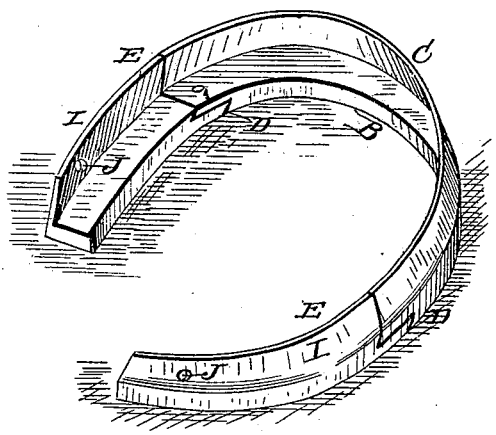
Figure 3:
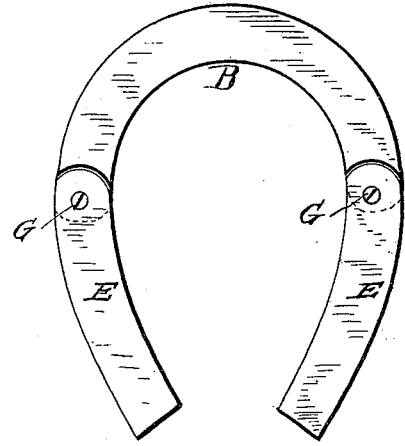
Figure 4:
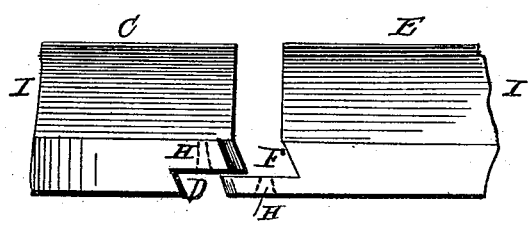

Figure 1 is a perspective view of a horse's hoof having my improved shoe. Fig. 2 is a perspective view of the shoe, taken from the rear end. Fig. 3 is a bottom view; and Fig. 4 is a detail view, showing the pieces separated.

Corresponding parts in the several figures are denoted by like letters of reference.

This invention relates to an improvement in horseshoes which are constructed substantially as hereinafter more fully described, and particularly pointed out in the claim.

Referring by letter to the drawings, A designates a horse's hoof to which is attached my improved flanged shoe B. C is the front piece, which is of a shape to closely fit the front part of the hoof, and is provided at its rear ends with dovetailed slots D, its ends overlapping or joining with the front ends of rear pieces, E E, and fitting in dovetailed slots F in the same. G is a bolt or screw which passes through countersunk perforations H H in the projecting ends of front piece, C, and rear pieces, E E, securely fastening the pieces together, but allowing the rear ones to move back and forth in adjusting or removing the shoe.

Pieces C E E are each provided with an inward-inclined flange or boot, I, made integral with them, the flanges on pieces E E having one or more perforations, J, to admit the passage of screws K, which pass into the hoof and secure the pieces E E thereto.

The manner of adjusting my improved shoe is as follows: The rear pieces are first turned outward and the hoof slid forward and fitted tightly against the flange on the front piece, between which and the shoe proper it will fit in a dovetailed manner. The rear pieces are then turned inward and brought against the hoof, the screws are inserted through the perforations in the same and screwed into the hoof. These screws are to keep the rear pieces from turning outward, the flange or boot preventing the shoe, on the top of which rests the hoof, from coming off.

While in use the shoe will expand with the tread of the horse, and at night, or when desired, it may be readily removed by simply reversing the above-described method of adjusting, the removal of the shoe being necessary for the health and growth of the hoof and affording great rest to the horse.

My improved flanged shoe is simple, durable, and easily adjusted or removed, and no nails being driven into the hoof, the latter is preserved from cracking.

Having thus described my invention, I claim and desire to secure by Letters Patent of the United States—

The herein-described horseshoe, consisting of the pivoted pieces C E E, connected by beveled dovetail joints D F, and provided with perforated flanges I, as and for the purpose set forth.

In testimony that I claim the foregoing as my own I have hereto affixed my signature in presence of two witnesses.

DABNEY BALL STEPHENS.

Witnesses:
J. R. LITTELL,
W. J. LITTELL.